(12) United States Patent
Tseng et al.

(10) Patent No.: US 9,919,868 B2
(45) Date of Patent: Mar. 20, 2018

(54) RECEPTACLE LINER

(71) Applicant: Inteplast Group, Ltd., Livingston, NJ (US)

(72) Inventors: Ben Tseng, Livingston, NJ (US); Jyh-yao Raphael Li, Livingston, NJ (US); Kelvin Yang, Livingston, NJ (US)

(73) Assignee: Inteplast Group Corporation, Livingston, NJ (US)

( * ) Notice: Subject to any disclaimer, the term of this patent is extended or adjusted under 35 U.S.C. 154(b) by 0 days.

(21) Appl. No.: 14/928,169

(22) Filed: Oct. 30, 2015

(65) Prior Publication Data

US 2017/0121105 A1     May 4, 2017

(51) Int. Cl.
| | |
|---|---|
| *B65D 30/02* | (2006.01) |
| *B65F 1/00* | (2006.01) |
| *B29C 47/00* | (2006.01) |
| *B29C 47/06* | (2006.01) |
| *B29K 23/00* | (2006.01) |
| *B29L 31/00* | (2006.01) |

(52) U.S. Cl.
CPC ........ *B65F 1/0006* (2013.01); *B29C 47/0026* (2013.01); *B29C 47/0066* (2013.01); *B29C 47/062* (2013.01); *B29C 47/065* (2013.01); *B29K 2023/0625* (2013.01); *B29K 2995/0046* (2013.01); *B29K 2995/0077* (2013.01); *B29L 2031/7129* (2013.01); *B65F 2250/114* (2013.01); *B65F 2250/1143* (2013.01)

(58) Field of Classification Search
CPC .............. B65F 1/0006; B65F 2250/114; B65F 2250/1143

USPC ................ 383/112, 118, 32, 33, 43, 105, 8; 220/495.11
See application file for complete search history.

(56) References Cited

U.S. PATENT DOCUMENTS 3,256,919 A * 6/1966 Ogletree .............. A45C 7/0063
                                                                    224/610
3,276,671 A * 10/1966 Fleitman ................ B65D 65/22
                                                                    206/521

(Continued)

FOREIGN PATENT DOCUMENTS

| DE | 202004012218 U1 | * | 1/2006 |
| WO | WO 0056635 A1 | * | 9/2000 |

OTHER PUBLICATIONS

Machine translation of the description of DE 202004012218.*

*Primary Examiner* — Jes F Pascua
(74) *Attorney, Agent, or Firm* — Senniger Powers LLP

(57) ABSTRACT

A receptacle liner for gripping the receptacle and method of making. A liner may be formed by one or more panels including at least one resilient segment extending from a bottom to a top of the liner. The liner segment can be coextruded so that the resilient segment is made from resilient material and other portions of the liner are made from another material that is less resilient. When the liner is placed in a receptacle, the liner can be expanded by resiliently stretching the resilient segment so that the liner may apply a gripping force to the receptacle. The liner can include gusseted side panels. A mouth can be formed as a recess in the top ends of front and rear panels and extend through the gusseted side panels to define handle portions and form apertures in the handle portions that open to the mouth.

10 Claims, 7 Drawing Sheets

(56) References Cited

U.S. PATENT DOCUMENTS

| | | | | |
|---|---|---|---|---|
| 3,454,441 | A * | 7/1969 | Spruyt | B31B 23/00 156/244.19 |
| 3,733,024 | A * | 5/1973 | Bolling, Jr. | B65D 33/02 383/107 |
| 4,015,635 | A * | 4/1977 | Goransson | B65D 33/00 138/119 |
| 4,401,427 | A | 8/1983 | Benoit et al. | |
| 4,464,157 | A * | 8/1984 | Benoit | B29C 47/064 493/211 |
| 4,509,570 | A | 4/1985 | Eby et al. | |
| 4,592,938 | A * | 6/1986 | Benoit | B29C 47/0021 156/244.12 |
| 4,597,749 | A * | 7/1986 | O'Brien | B65D 33/065 156/284 |
| 4,611,350 | A | 9/1986 | Kaczerwaski | |
| 4,715,572 | A | 12/1987 | Robbins, III et al. | |
| 4,747,701 | A | 5/1988 | Perkins | |
| 4,919,546 | A | 4/1990 | Imazeki et al. | |
| 4,953,704 | A | 9/1990 | Cortese | |
| 5,040,902 | A | 8/1991 | Eaton et al. | |
| 5,205,650 | A | 4/1993 | Rasmussen | |
| 5,232,118 | A | 8/1993 | Samuel | |
| 5,287,903 | A * | 2/1994 | Ambasz | A45C 7/0022 150/129 |
| 6,059,458 | A | 5/2000 | Belias et al. | |
| 6,164,824 | A | 12/2000 | McGlew et al. | |
| 6,220,753 | B1 | 4/2001 | Metzger | |
| 6,398,411 | B2 | 6/2002 | Metzger | |
| 6,402,377 | B1 | 6/2002 | Vo et al. | |
| 6,513,975 | B1 * | 2/2003 | Jackson | B65D 33/00 383/105 |
| 6,921,202 | B2 | 7/2005 | Raterman | |
| 6,939,042 | B2 | 9/2005 | Rusnak et al. | |
| 6,966,697 | B2 | 11/2005 | Patridge et al. | |
| 6,994,469 | B2 | 2/2006 | Sleight et al. | |
| 7,077,796 | B2 | 7/2006 | Rusnak et al. | |
| 7,300,395 | B2 | 11/2007 | Sleight et al. | |
| 7,344,309 | B2 | 3/2008 | Patridge et al. | |
| 7,347,624 | B2 | 3/2008 | Savicki, Sr. et al. | |
| 7,459,191 | B2 | 12/2008 | Sleight et al. | |
| 8,029,192 | B2 * | 10/2011 | Weissbrod | B65D 31/10 383/10 |
| 8,637,129 | B2 * | 1/2014 | Withers | B29C 47/0021 428/34.4 |
| 8,734,016 | B2 * | 5/2014 | Borchardt | B29C 55/08 383/105 |
| 2010/0224634 | A1 | 9/2010 | Mays-Hornung | |
| 2010/0239191 | A1 | 9/2010 | Chilton | |
| 2012/0027321 | A1 * | 2/2012 | Tan | B65D 31/10 383/8 |
| 2012/0099807 | A1 | 4/2012 | Ross | |
| 2013/0068770 | A1 | 3/2013 | Mays-Hornung | |
| 2016/0325929 | A1 | 11/2016 | Abang, Jr. | B65F 1/0013 |

\* cited by examiner

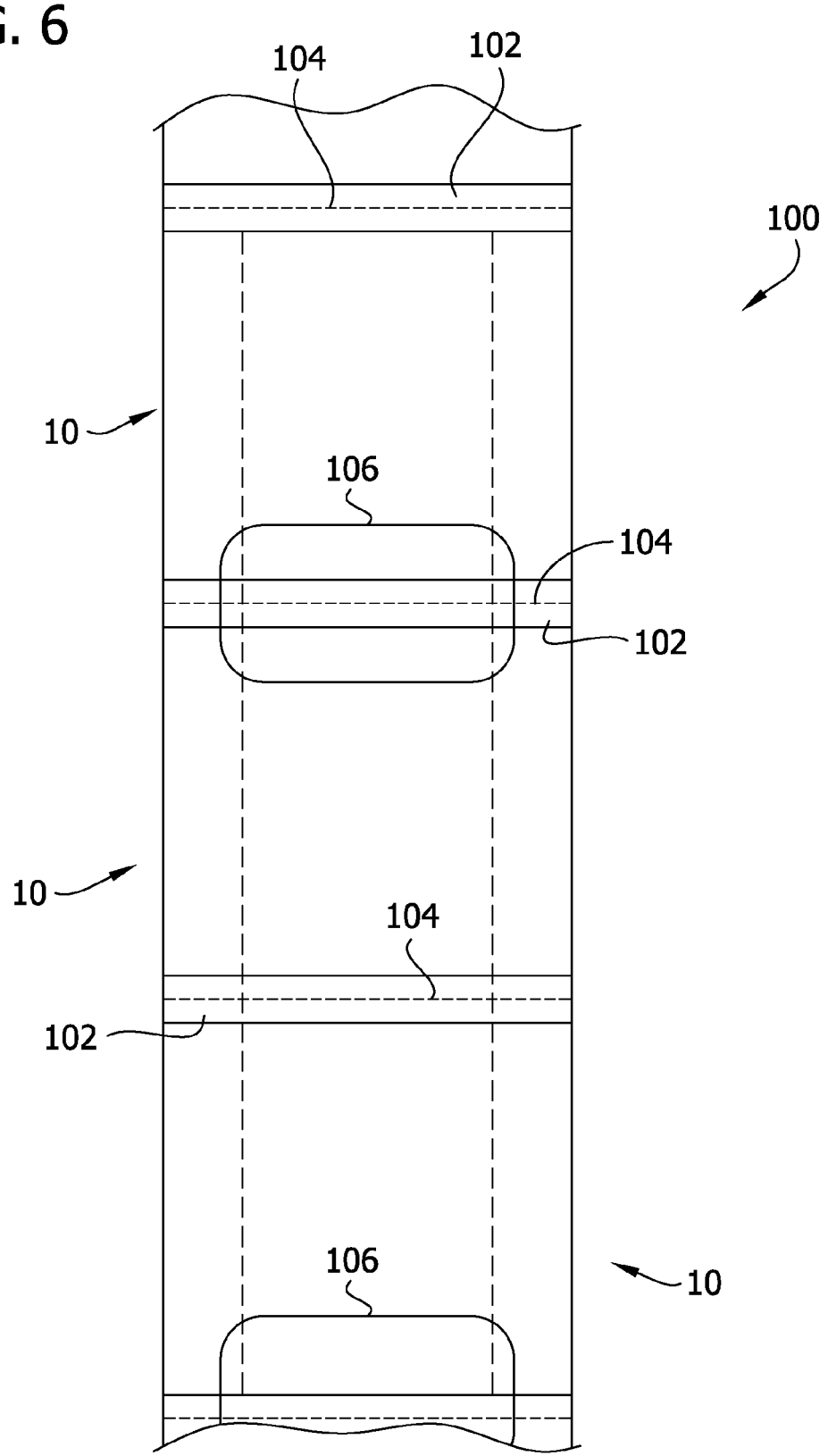

RECEPTACLE LINER

FIELD

The present invention generally relates to liners for lining receptacles, and more particularly to a liner configured to securely grip the rim of a receptacle in use.

BACKGROUND

Liners are used to line waste cans and other receptacles. Conventional liners have closed bottom ends and open top ends. Typically, when liners are placed into a receptacle, the top end portion of the liner is loosely fitted around the rim to secure the liner to the receptacle. Conventional liners lack features for securely gripping the rim of the receptacle and are, therefore, prone to fall off in use. Some liners have features such as elastic drawstrings, which are added to the liner in additional manufacturing steps, that grip the receptacle rim and provide a structure for carrying and closing the liner.

SUMMARY

In one aspect, a liner for lining a receptacle comprises a first segment extending from a bottom of the liner to a top of the liner and a second segment extending from the bottom of the liner to the top of the liner. The first and second segments are operatively connected to each other and arranged to at least partially define an interior volume of the liner, form the bottom of the liner that is closed, and form the top of the liner having a mouth opening into the interior volume of the liner. The first segment is formed of a first material and the second segment is formed of a second material that is more elastically resilient than the first material whereby the mouth at the top of the liner can be expanded by resiliently stretching the second segment so that the liner may apply a gripping force to the receptacle in which the liner is placed.

In another aspect, a liner for lining a receptacle comprises a front panel, a rear panel and side panels operatively interconnecting the front and rear panels on respective opposite sides of the liner. The front, rear, and side panels are arranged to define an interior volume of the liner, form a bottom edge of the liner that is closed, and form a top edge of the liner. The top edge of the liner includes a mouth that opens into the interior volume of the liner. The side panels each have a fold extending between the bottom and the top of the liner. Top margin portions of each of the side panels are folded onto themselves and joined together on opposite sides of the mouth. The side panels have apertures therethrough communicating with the mouth for use in exhausting air between the liner and the receptacle when the liner is placed in the receptacle.

In another aspect, a method of making a liner for a receptacle comprises extruding panels from a first material and second material that is more elastically resilient than the first material. The panels define an interior volume, a bottom and a top. The panels extend from the bottom to the top of the liner. The second material forms a resilient segment extending from the bottom to the top of at least one of the panels of the liner. The panels are connected to close the bottom of the liner and to form a mouth at the top of the liner opening into the interior volume of the liner.

Other objects and features will be in part apparent and in part pointed out hereinafter.

BRIEF DESCRIPTION OF THE DRAWINGS

FIG. 6 is an elevation of an extruded tube from which liners can be formed.

Corresponding reference characters indicate corresponding parts throughout the drawings.

DETAILED DESCRIPTION

Figure 1:
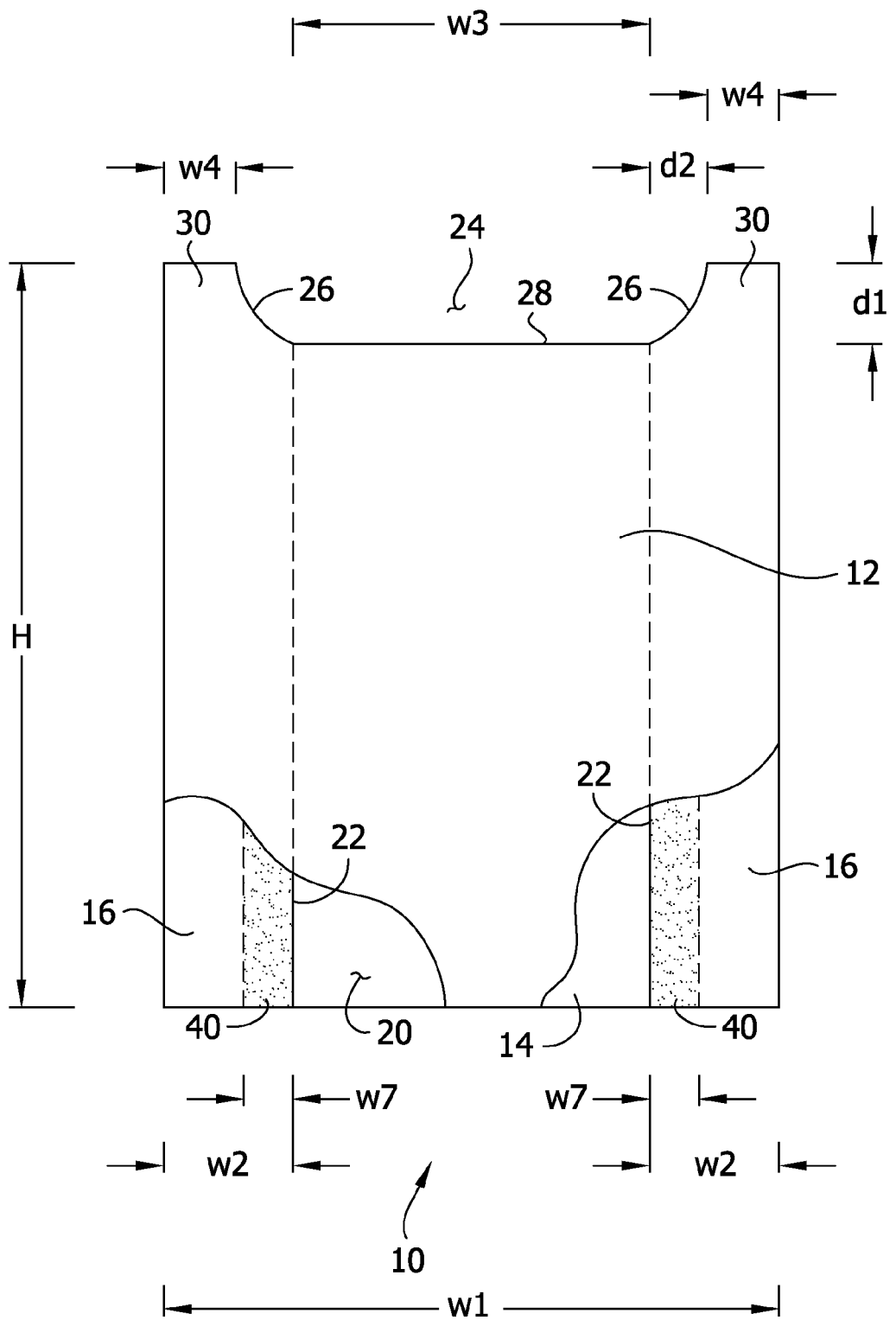
FIG. 1 is a fragmentary front elevation of a liner in a flattened configuration with parts broken away to show internal construction.
Figure 2:
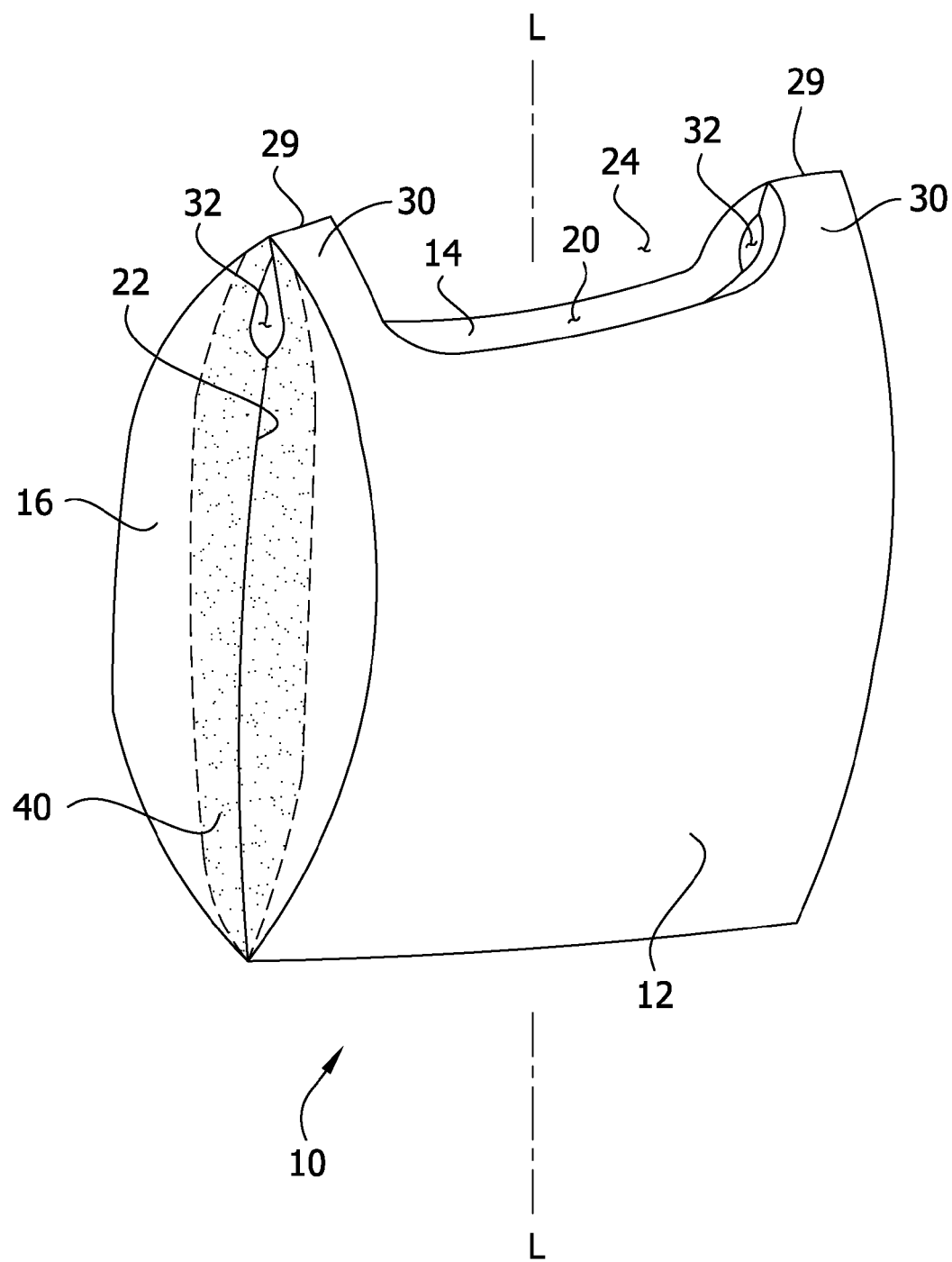
FIG. 2 is a perspective of the liner in the expanded configuration.
Figure 3:
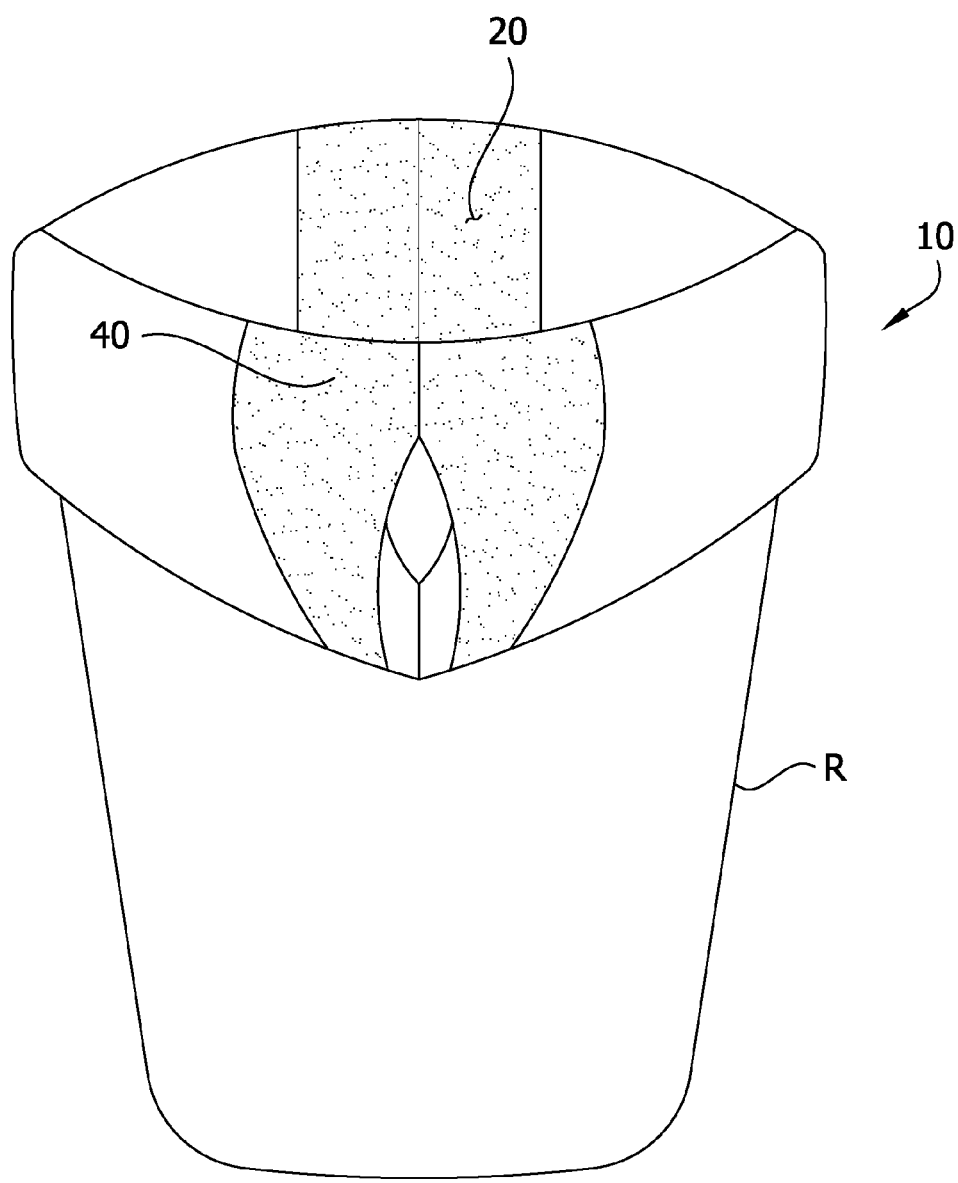
FIG. 3 is a perspective of the liner installed in a receptacle.

Referring to FIGS. 1-3, a liner for lining a receptacle R (FIG. 3), such as a wastebasket, is generally indicated at reference number 10. The liner 10 is constructed from liner panels that extend around an interior volume 20 and form a bottom of the liner that is closed and a top of the liner that is open. As will be discussed in further detail below, a portion of the liner 10 is formed from an elastically resilient material so that, when the liner is placed in the receptacle R, the top portion of the liner grips the rim of the receptacle to prevent the liner from falling off in use. The liner 10 also includes user-friendly handles for manipulating the liner. It will further be appreciated that the liner 10 can be formed in a relatively simple manufacturing process. A minimal number of manufacturing steps form the liner 10 in such a way that it both includes the user friendly handles and can elastically grip the rim of the receptacle R.

The illustrated liner 10 has a gusseted bag configuration. The liner has a front panel 12, a rear panel 14, and gusseted first and second side panels 16. The panels 12, 14, 16 extend along a height H of the liner 10 from bottom to top and are arranged to extend around and define the interior volume 20. The side panels 16 operatively interconnect the front and rear panels 12, 14 on opposite sides of the liner 10. Each of the side panels 16 includes a fold 22 extending from the bottom of the liner 10 to the top. The liner 10 is selectively expandable from a flattened configuration (FIG. 1) to an expanded configuration (FIG. 2). In the flattened configuration (FIG. 1), the side panels 16 are folded over upon themselves along the folds 22 and positioned between the front and rear panels 12, 14. When the liner 10 expands to the expanded configuration (FIG. 2), the side panels 16 open along the folds 22 to form sides of the liner. Though the illustrated liner 10 has a gusseted bag configuration, liners having other configurations (e.g., where front and rear panels are joined together along the sides edges of the liner, etc.) can also be used without departing from the scope of the invention.

Figure 1A:
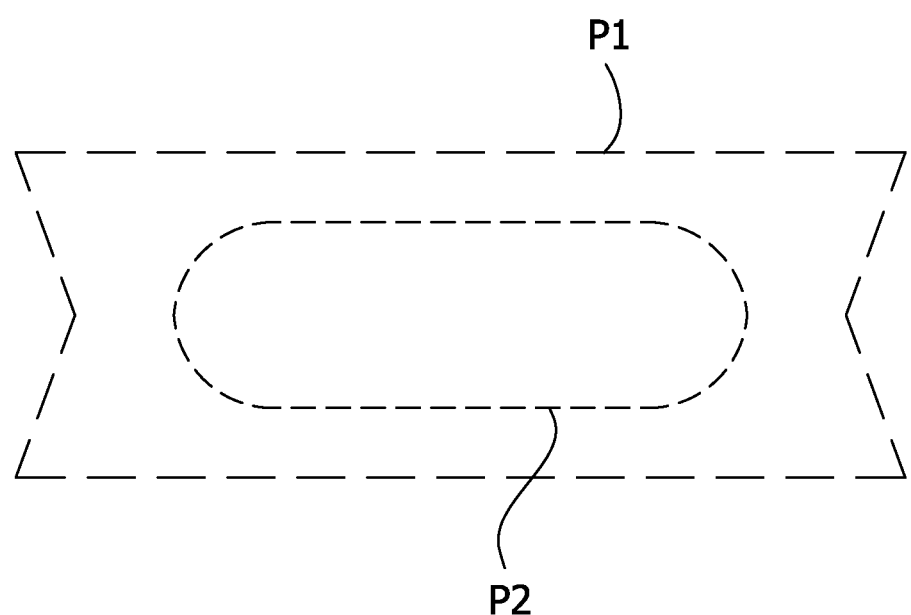
FIG. 1A is a schematic illustrating relative sizes of a perimeter of the liner and a perimeter of a mouth of the liner.
Figure 4:
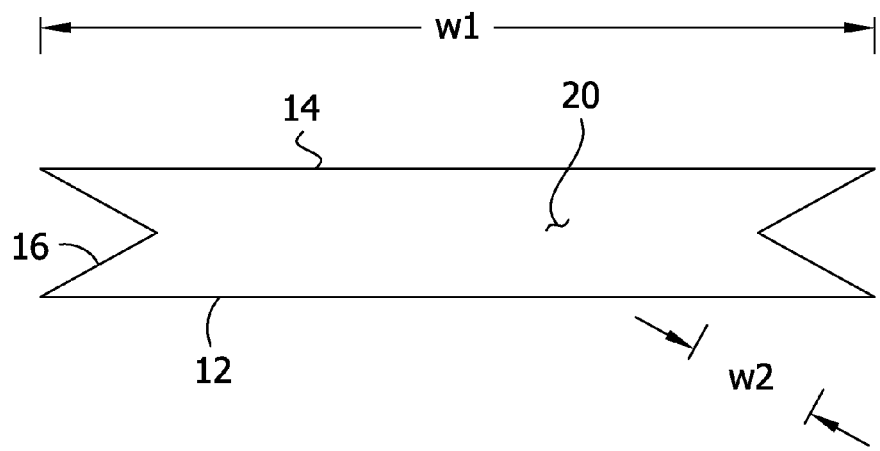
FIG. 4 is cross-sectional plan view of the liner in a partially expanded configuration.

Referring to FIG. 2, the liner 10 has a perimeter P1 (FIG. 1A) that extends around an axis L extending from the bottom to the top of the liner along the exterior surfaces of the panels 12, 14, 16. The perimeter P1 measures the distance around the outside of the liner in the expanded configuration. Since the liner 10 is a gusseted bag, the perimeter P1 is the sum of the widths of the front, rear, and side panels 12, 14, 16. Referring to FIGS. 1 and 4, the front and rear panels 12, 14 each have a width of w1. For each side panel 16, a width w2 measures the distance from the side edges of the front and rear panels 12, 14 to the fold line 22 (i.e., a half-width of the side panel). Thus, each side panel 16 has a total width equal to twice the width w2, and the liner perimeter P1 is calculated according to Equation 1 below.

$$P1 = 2*w1 + 4*w2 \quad \text{Equation 1:}$$

The open top end of the liner 10 defines a mouth 24 that opens to the interior volume 20. The mouth 24 has a mouth perimeter P2 (FIG. 1A) that is generally a measurement of the distance around the opening in the top end portion of the liner 10 that defines the mouth. The mouth perimeter P2 is preferably smaller than the liner perimeter P1 (i.e., P1>P2) so that, when the liner 10 is placed in an appropriately sized receptacle R (FIG. 3), the body of the liner in the expanded configuration substantially fills the receptacle and the top end portion of the liner is stretched radially over the rim. As will be discussed in further detail below, a portion of the liner 10 comprises elastically resilient material so that the top end portion grips the receptacle R when it is fitted over the rim. In part, the relative dimensions of the liner perimeter P1 and the mouth perimeter P2 configure the top end portion of the liner for elastically gripping the rim of the receptacle R in use. In one or more embodiments the mouth perimeter P2 is from about 50% to about 99% of the liner perimeter P1 (e.g., from about 70% to about 95%).

Figure 5:
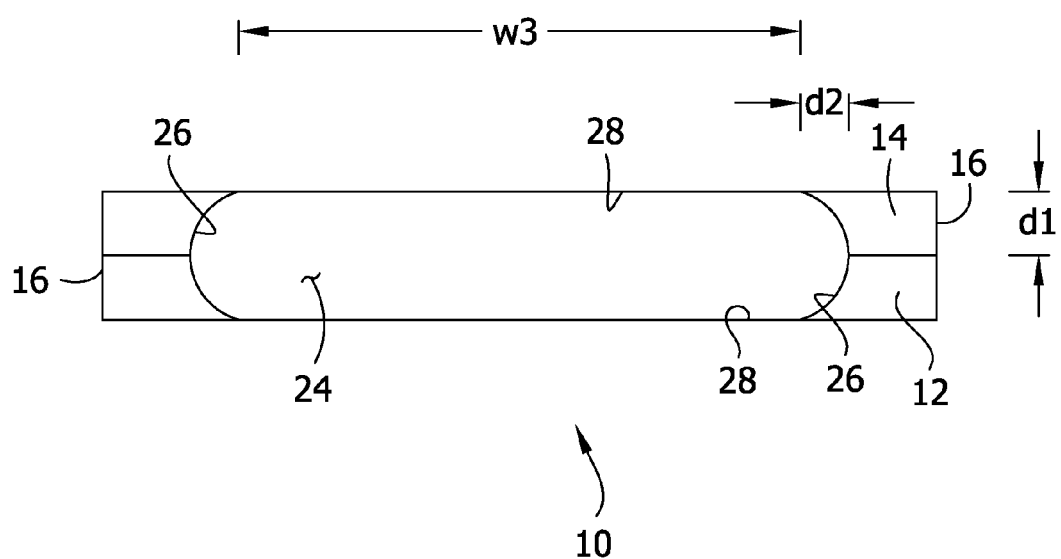
FIG. 5 is a top plan view of the liner in the expanded configuration.

Referring to FIGS. 1 and 5, the illustrated mouth 25 has a perimeter P2 that is twice the length of a cut that extends through the front and rear panels 12, 14 in the flattened configuration. The cut forms a central recess portion of the liner 10 that defines the mouth 24. Two side cut segments 26 are spaced apart from the side edges of the front and rear panels 12, 14. The side cut segments 26 extend down and inward from the top edge of the liner 10, through the front and rear panels 12, 14. As will be discussed in further detail below, the side cut segments 26 are preferably positioned along the top edge so that they extend into the respective gusseted side panels 16 and remove an inner corner portion thereof. In the illustrated embodiment, the side cut segments 26 are elliptical arc-shaped cuts that extend downward from the top edge a distance d1 and inward a distance d2. A cross cut segment 28 extends a width w3 between the two side cut segments 26 to from the mouth 24. The perimeter P2 of the illustrated mouth 24 can be approximated according to equation 2 below.

$$P2 = 2*w3 + 2\pi \sqrt{\frac{(d1^2 + d2^2)}{2}} \quad \text{Equation 2}$$

In one or more preferred embodiments, the half-width w2 of the side panels 16 is greater than $$\frac{\pi}{4} * \sqrt{\frac{d1^2 + d2^2}{2}}.$$

This ensures that the perimeter of the mouth P2 is smaller than the perimeter of the liner P2 so that the rim portion of the liner must stretch to be fitted over a properly sized receptacle R.

As will be discussed in further detail below, the mouth 24 is formed by cutting away a section of the liner material, thereby allocating a portion of the liner material to waste. Generally, it is preferable to minimize the amount of waste produced when manufacturing the liner 10. A useful measurement of waste is a waste ratio γ, which compares the amount of material waste with the total amount of material used in producing the liner 10. The total area A1 (not shown in drawings) of the liner material used to form the liner 10 is calculated according to Equation 3 below. The total area A2 (not shown in drawings) of the front and rear liner panels 12, 14 that is removed to form the mouth 24 is approximated according to Equation 4 below. In addition, a small portion of each of the side panels 16 having an area A3 (not shown in drawings) is removed in the illustrated embodiment. Thus, the waste ratio γ can be calculated according to Equation 5 below. Preferably, the waste ratio γ is from about 2.5% to about 50%, preferably from about 5% to about 25%.

$$A1 = H * P1 \quad \text{Equation 3}$$

$$A2 = \pi * d1 * d2 + 2 * d1 * w3 \quad \text{Equation 4}$$

$$\gamma = \frac{A2 + 2*A3}{A1} \quad \text{Equation 5}$$

Referring to FIGS. 1 and 2, the top edge of the liner 10 is sealed along respective seams 29 on each side of the mouth 24 to form handle portions 30. In the illustrated embodiment, the front panel 12, rear panel 14, and a respective one of the side panels 16 is joined together at the top edge to form each handle portion 30. The top end margins of each of the side panels 16 are folded onto themselves along the fold lines 22 and joined together in one of the seams 29 along with portions of the front and rear panels 12, 14. As shown in FIG. 2, the side panels 16 have handle apertures 32 extending through the side panel at the handle portions 30 in fluid communication with the mouth 24 of the liner 10. The handle aperture 32 in each of the side panels 16 is located at the fold 22 of the side panel. As discussed above, the apertures 32 are preferably formed by the side cut segments 26 of the mouth 24, which remove upper inner corner portions of the side panels 16 in the flattened configuration (FIG. 1). Moreover, it may be seen that the width of the mouth 24 along the top edge of the liner 10 (2*d2+w3) is less than the length of the top edge (2*w4+2*d2+w3).

The handle portions 30 of the liner 10 can serve several purposes. For example, a user can grasp the liner through the handle apertures 32 when carrying the liner or tie the handle portions 30 to one another to cinch the liner closed. To be used for carrying the liner 10, the handle portions 30 should preferably be robust enough to support the weight of the liner when it is filled with contents. To provide sufficient robustness, the panels 12, 14, 16 are sealed together along the seams 29 to form the handle portions 30. In one or more embodiments, a width w4 (FIG. 1) of each handle portion 30 or seam 29 is from about 10% to about 90% of the half-width w2 of the side panel 16, preferably from about 30% to about 75% of the half-width w2. The handle apertures 32 also provide openings for exhausting air between the liner 10 and the receptacle R when the liner is placed in the receptacle. This allows the liner 10 to conform more closely to the interior of the receptacle R.

As mentioned briefly above, the liner 10 is partially formed from an elastically resilient material that configures the liner for resiliently gripping the rim of the receptacle R in use. Preferably, the liner 10 is formed from a plurality of materials. For example, in the illustrated embodiment, most of the liner 10 is formed from a first material, and an elastic portion 40 of the liner is formed from a second material that is more elastically resilient than the first material. More specifically, the illustrated liner 10 includes an elastic segment 40 at each of the side panels 16 that is composed of the second, elastically resilient material. In a preferred embodiment, the elastic segments 40 are coextruded with the rest of the liner 10 in a single process.

The composition of the first and second materials affects the overall elastic properties of the liner 10. In one or more preferred embodiments, the first material is a polyolefin polymer, such as high density polyethylene (HDPE), linear low density polyethylene (LLDPE), blends of polyethylenes, etc. These materials have high tensile strength and/or good tear strength, and different ones of these materials can have properties better suited to different applications. For example, HDPE is suitable for can liners requiring high strength and LLDPE has strong tear resistance and forms comparatively soft can liners. In certain preferred embodiments, the second, elastic material is an elastic resin comprising polyolefin polymers. As a general matter, the elastic material can comprise a high performance, conventional or single-site metallocene-LLDPE (m-LLDPE), an ethylene-vinyl acetate (EVA) copolymer, a LLDPE, or any combination thereof, with or without additives. Preferred materials will have high tensile elongation, low tensile yield strength, and a tensile modulus that is less than that of the first material. For example, in one or more embodiments, the second material can have a tensile yield strength in the machine direction of no more than about 14 MPa (about 2000 psi), a tensile yield strength in the transverse direction of no more than about 14 MPa (2000 psi), a tensile elongation at break point in the machine direction of at least about 500%, and a tensile elongation at break point in the transverse direction of at least about 700%. The second, elastic material should preferably configure the elastic segments to be stretchable along their widths (e.g., in the transverse direction of the material) and to elastically rebound with sufficient strength to grip the rim of the receptacle R.

In the illustrated embodiment, one elastic segment 40 is located at each of the side panels 16. Although this embodiment includes two elastic segments that are located at the side panels 16, other embodiments can use other numbers of elastic segments and/or elastic segments located at other positions around the perimeter of the liner without departing from the scope of the invention. Each elastic segment 40 extends along the height H of the liner 10 from the bottom to the top. As will be discussed in further detail below, this arrangement is suitable for coextruding the elastic segments 40 with the rest of the liner 10. In the illustrated embodiment, the elastic segments 40 extend less than the entire width of the side panels 16. But in other embodiments, the elastic segments could extend other widths without departing from the scope of the invention. For example, the side panels 16 may be formed entirely from the more resiliently elastic second material such that the side panels constitute elastic segments 40. Moreover, the elastic segment 40 may be located other than in the side panels 16 within the scope of the invention.

Figure 2A:
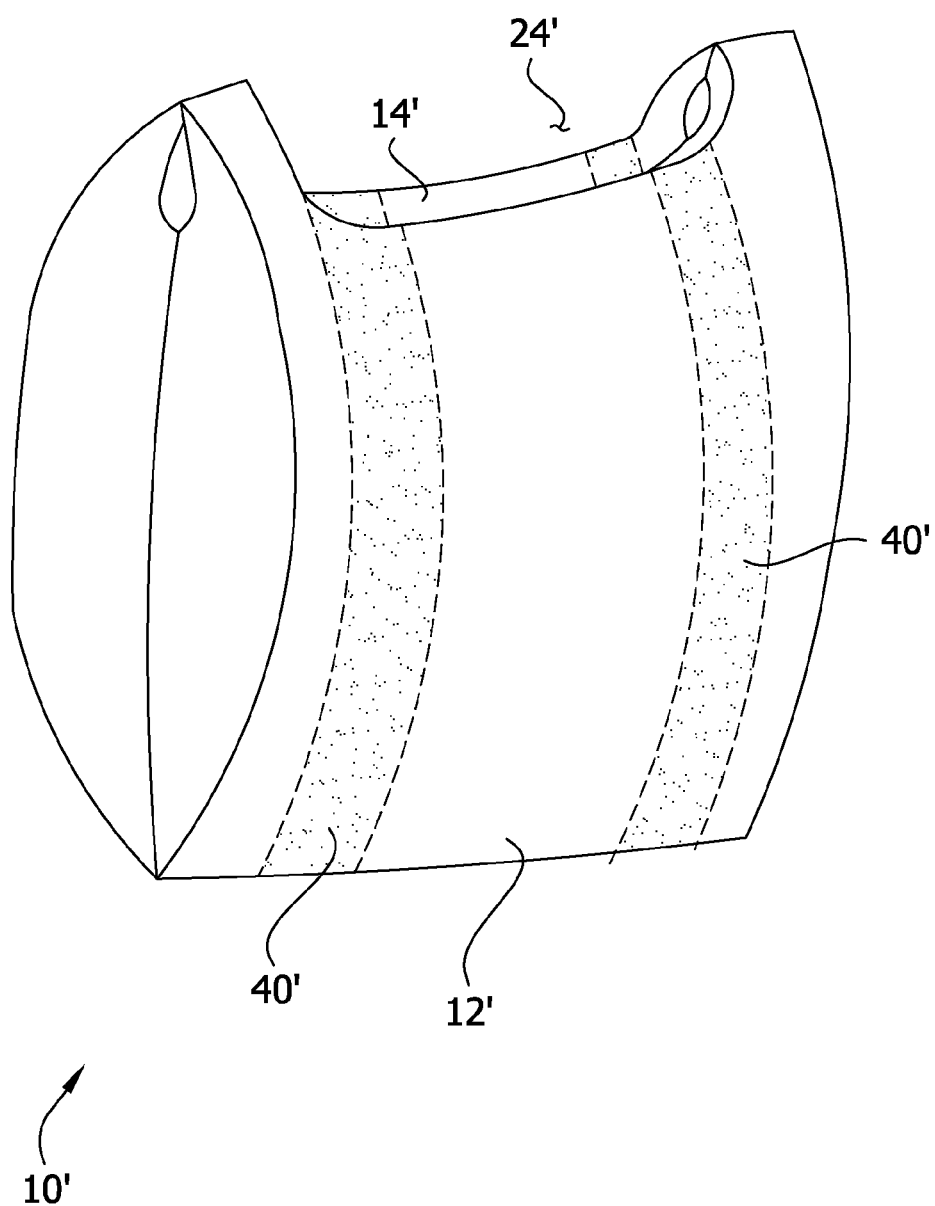
FIG. 2A is a perspective of another embodiment of a liner in the expanded configuration.

For example, as shown in FIG. 2A, in a preferred embodiment the elastic segments 40' are generally aligned with the corners of the mouth 24' (the corners of the mouth can be located at locations where front and rear edges of the mouth are connected to side edges of the mouth). In the illustrated embodiment, the liner 10' includes four elastic segments 40'. Two elastic segments 40' form part of the front panel 12' and two of the elastic segments 40' form part of the rear panel 14'. Each elastic segment 40' is spaced apart from a respective corner of the liner and extends vertically from the bottom edge to the mouth 24'. It is believed that when the upper portion of the liner 10' is stretched over the receptacle R, radial forces will tend to be more concentrated near the corners of the mouth 24'. By positioning the elastic segments 40' at concentrated force locations, it is more likely that the liner will stretch along the elastic segments 40' than non-elastic portions of the liner 10'.

Referring again to FIG. 2, the size of the elastic segments 40 in relation to the total size of the liner 10 effects the elastic properties of the liner. Since the elastic segments 40 extend along the height H of the liner 10 from the bottom edge to the top edge, a combined width w5 (not shown in the drawings) of the elastic segments 40 can be compared with the liner perimeter P1 to evaluate the relative sizes of the elastic segments and liner. In the illustrated embodiment, each elastic segment 40 is centered at the respective fold 22 and has a segment width w6 (not shown in the drawings) that is two-times a half-width w7 (FIG. 1), which extends from the edge of the elastic segment to the fold. Thus, in the illustrated embodiment, the total elastic portion width w5 is equal to four-times the elastic segment half-width w7. In one or more embodiments, the total width w5 of the elastic portion of the liner 10 is from about 5% to about 60% of the perimeter P1 of the liner (e.g., from about 10% to about 40%).

In use, the liner 10 can be securely installed in the receptacle R. Prior to use, the liner 10 can be folded and wound onto a roll (not shown) with other identical liners. The user removes the liner 10 from the roll and unfolds the liner so that it is in the flattened configuration illustrated in FIG. 1. The user then opens the liner 10 to the expanded configuration shown in FIG. 2 and places the bottom end portion of the liner into the receptacle R. The user radially stretches and inverts the top end portion of the liner 10 to fit it over the rim. The elastic segments 40 stretch along their widths to allow the top end portion of the liner to expand. The user releases the liner once the top end portion extends around and over the rim of the receptacle R. As shown in FIG. 3, the elastic segments 40 resiliently rebound toward their original dimensions, thereby gripping the rim and securing the liner 10 to the receptacle R. The elastic gripping force inhibits the top end portion of the liner 10 from being pulled into the interior of the receptacle R as waste or other objects are placed in the liner.

A method of manufacturing the liner 10 will now be briefly described. As discussed above, the body of the liner 10 can be coextruded in a single process. In one embodiment, a coextrusion die defines four channels: first and second spaced apart channels at opposite sides of the die and third and fourth channels extending between the first and second channels at opposite ends of the die. The extrusion process delivers a first material to the first and second channels and a second material to the third and fourth channels. The second material is more elastically resilient than the first material. Referring to FIG. 6, the process forms a continuous tube 100 having a length and comprising four segments (not distinguished in FIG. 6). Together, the four segments extend around the circumference of the tube. And each of the four segments individually extends continuously along the length of the tube. Two of the segments are formed of the first material and two of the segments are formed of the second material. As will be discussed in further detail below, the tube 100 is eventually divided into liner segments and processed to form liners 10. The two segments of the tube formed of the second elastically resilient material form the elastic segments 40 of the resulting liners 10.

Although the above extrusion process is suitable for manufacturing a liner 10 with two elastic segments 40 along the side panels 16 of the liner, it will be understood that liners with other numbers and locations of elastic segments can also be coextruded without departing from the scope of the invention. Generally, a suitable process will be configured to extrude a tube that comprises multiple panels, including at least one resilient panel that includes at least a segment that has greater elastic resiliency than other panels. This can be accomplished by extruding one or more segments of a coextruded tube from a material having a greater elastic resiliency than the material(s) used to form the remainder of the tube. In one or more preferred embodiments, the tube is extruded so that the elastic segment(s) extends along the length of the tube. For example, to extrude a liner tube for forming liners of the type shown in FIG. 2A, the liner tube is extruded to have eight segments including four spaced apart, resilient segments extending the length of the liner tube and positioned to be aligned with the corners of the mouth 24' once the liner 10' is formed.

As shown in FIG. 6, during or after extrusion of the tube 100, side portions thereof can be folded inward to form the gusseted side panels 16. Seals 102 are formed at spaced apart locations along the length of the tube to define separate liners 10 and connect together the front, rear, and side panels 12, 14, 16. The seals divide the tube into segments and define the top and bottom edges of respective liners 10. In a preferred embodiment, perforations 104 (broadly, a zone of weakness) are formed with the seals 102 for separating the liner tube segments from one another. Before or after separating the tube segments, the mouth can be formed in each liner 10 by cutting away a central recess portion of the top end portion of each liner. As shown in FIG. 6, in certain embodiments, a die cut 106 forms mouths 24 of two adjacent liners 10 at the same time before the liners are separated along the perforations 102. Preferably, the top end portion of each liner 10 is cut in the flattened configuration along a cut that extends through inner ends of the gusseted side panels 16 to form the handle apertures 32 in the same step as forming the mouth 24. In certain embodiments, the tube 100 is wound onto a roll (not shown), and a user can remove individual liners from the roll by tearing the tube of interconnected liners 10 along the zones of weakness 104. In an alternative embodiment, the liners 10 are separated from one another and placed in a pile that is packaged in a box or other container.

As can be seen, the liner 10 can be manufactured in a relatively simple process that includes a minimal number of steps and produces a relatively minimal amount of waste. Once manufactured, the liner 10 is configured to be securely mounted on a receptacle R by applying a gripping force around the rim, and no additional processing steps are required to add an elastic material to the liner body. The resulting liner 10 also includes handle portions and apertures 30, 32 that are useful in handling a filled liner and venting air between the liner and receptacle during placement.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A liner for lining a receptacle, the liner comprising a first segment extending from a bottom of the liner to a top of the liner and a second segment extending from the bottom of the liner to the top of the liner, the first and second segments being operatively connected to each other and arranged to at least partially define an interior volume of the liner, form the bottom of the liner that is closed and form the top of the liner having a mouth opening into the interior volume of the liner, the first segment being formed of a first material and the second segment being formed of a second material that is more elastically resilient than the first material whereby the mouth at the top of the liner can be expanded by resiliently stretching the second segment so that the liner may apply a gripping force to the receptacle in which the liner is placed; wherein the mouth has a mouth perimeter and wherein the liner comprises a liner perimeter about an axis of the liner extending from the bottom to the top of the liner, the mouth perimeter being from about 50% to about 99% of the liner perimeter; and wherein:

the liner comprises a front panel, a rear panel, a top edge at the top of the liner, and first and second handle portions at the top of the liner arranged on opposite sides of the mouth;

the front panel and the rear panel are joined together along each of the first and second handle portions at the top edge of the liner;

the mouth perimeter includes at least a front edge at the front panel, a rear edge at the rear panel, and first and second side edges extending between the front and rear edges; and each of the first and second side edges includes a front segment extending along a respective one of the first and second handle portions from adjacent the front edge to the top edge of the liner and a rear segment extending along the respective one of the first and second handle portions from adjacent the rear edge to the top edge of the liner.

2. A liner as set forth in claim 1 wherein the first and second segments are co-extruded.

3. A liner as set forth in claim 1 wherein the first and second side edges of the mouth are connected to the front and rear edges of the mouth at respective corners.

4. A liner as set forth in claim 3 wherein the second segment is generally aligned with one of the corners.

5. A liner as set forth in claim 4 further comprising third, fourth, and fifth segments comprising the second material and extending from the bottom of the liner to the top of the liner, the second, third, fourth, and fifth segments of the liner each being generally aligned with a respective one of the corners of the mouth.

6. A liner as set forth in claim 5 further comprising sixth, seventh, and eighth segments comprising the first material and extending from the bottom of the liner to the top of the liner, the first, sixth, seventh, and eighth segments each extending between a respective adjacent pair of the said second, third, fourth, and fifth segments.

7. A liner as set forth in claim 1 wherein the second material comprises one of a high performance, conventional or single-site metallocene-linear low density polyethylene, an ethylene-vinyl acetate copolymer, and a linear low density polyethylene.

8. A liner for lining a receptacle, the liner comprising a first segment, a second segment, a third segment, a fourth segment, a fifth segment, a sixth segment, a seventh segment, and an eighth segment, each of the first, second, third, fourth, fifth, sixth, seventh, and eighth segments extending from the bottom of the liner to the top of the liner and the first, second, third, fourth, fifth, sixth, seventh, and eighth segments being operatively connected to each other and arranged to at least partially define an interior volume of the liner, form the bottom of the liner that is closed and form the top of the liner having a mouth opening into the interior volume of the liner, the mouth having a front edge, a rear edge, and first and second side edges extending between the front and rear edges and connected to the front and rear edges at respective corners, the first, second, third, and fourth segments being formed of a first material and the fifth, sixth, seventh, and eighth segments being arranged side-by-side in alternating sequence with the first, second, third, and fourth segments and formed of a second material that is more elastically resilient than the first material in a circumferential direction of the liner whereby the mouth at the top of the liner can be expanded by resiliently stretching the fifth, sixth, seventh, and eighth segments so that the liner may apply a gripping force in the circumferential direction of the liner to the receptacle in which the liner is placed, wherein:
  at least some of the first, second, third, and fourth segments define side panels of the liner;
  each of the fifth, sixth, seventh, and eighth segments is aligned with a respective one of the corners of the mouth;
  each of the first, second, third, and fourth segments is aligned with a respective one of the front, rear, and first and second side edges of the mouth; and
  the side panels are free of the fifth, sixth, seventh, and eighth segments.

9. A liner as set forth in claim 8 wherein the mouth has a mouth perimeter and wherein the liner comprises a liner perimeter about an axis of the liner extending from the bottom to the top of the liner, the mouth perimeter being from about 50% to about 99% of the liner perimeter.

10. A liner as set forth in claim 8 wherein the second material comprises one of a high performance, conventional or single-site metallocene linear low density polyethylene, an ethylene-vinyl acetate copolymer, and a linear low density polyethylene.

* * * * *